(12) United States Patent
Waldstaedt et al.

(10) Patent No.: US 7,479,057 B2
(45) Date of Patent: Jan. 20, 2009

(54) DEVICE FOR PROVIDING A SECOND TAIL LENGTH

(75) Inventors: Manfred Waldstaedt, Mainz (DE); Martin Zurwieden, Sassenberg (DE)

(73) Assignee: Poly-Clip System GmbH & Co. KG (DE)

( * ) Notice: Subject to any disclaimer, the term of this patent is extended or adjusted under 35 U.S.C. 154(b) by 11 days.

(21) Appl. No.: 11/738,021

(22) Filed: Apr. 20, 2007

(65) Prior Publication Data

US 2008/0014847 A1 Jan. 17, 2008

Related U.S. Application Data

(60) Provisional application No. 60/745,315, filed on Apr. 21, 2006.

(30) Foreign Application Priority Data

Apr. 21, 2006 (DE) ........................ 10 2006 018 566

(51) Int. Cl.
*A22C 11/00* (2006.01)
(52) U.S. Cl. ....................................................... 452/32
(58) Field of Classification Search ............ 452/21–26, 452/30–37, 46–48, 51
See application file for complete search history.

(56) References Cited

U.S. PATENT DOCUMENTS

| | | | |
|---|---|---|---|
| 3,748,690 A * | 7/1973 | Niedecker | 452/31 |
| 4,434,528 A | 3/1984 | Niedecker | |
| 4,437,209 A * | 3/1984 | Duroyon | 452/32 |
| 4,675,945 A | 6/1987 | Evans et al. | |
| 5,087,463 A * | 2/1992 | Raudys et al. | 426/138 |
| 5,405,288 A * | 4/1995 | Stanley | 452/48 |
| 5,755,022 A * | 5/1998 | Whittlesey | 29/788 |
| 6,524,178 B1 * | 2/2003 | Fassler et al. | 452/37 |
| 6,705,063 B1 | 3/2004 | Topfer et al. | |

FOREIGN PATENT DOCUMENTS

| | | |
|---|---|---|
| DE | 2054441 | 11/1970 |
| DE | 2210054 | 3/1972 |
| DE | 2254943 | 11/1972 |
| DE | 3505375 | 8/1986 |
| DE | 3840522 | 7/1989 |
| DE | 20 2005 007 176 | 8/2005 |

OTHER PUBLICATIONS

European Search Report for EP07001163.0-2313.

* cited by examiner

*Primary Examiner*—Thomas Price
(74) *Attorney, Agent, or Firm*—Hahn Loeser & Parks LLP; Michael H. Minns (57) ABSTRACT

A device as well as a method for forming a sausage tail on a casing material, that receives a filling product, in particular sausage meat, wherein the sausage tail at least approximately does not contain filling product at least while it is being formed. The device contains a feeding path for the casing material, which extends in an at least approximately linear direction and along which the sausage tail is formed, a supply unit for receiving a supply of empty casing material and a first unit for forming sausage tails that is capable of acting on the casing material in direction of the feeding path for forming a first sausage tail length by pulling casing material from the supply. Furthermore, a second unit for forming sausage tails is provided that is capable of forming a second sausage tail length by pulling further casing material from the supply.

21 Claims, 10 Drawing Sheets

Fig. 10

DEVICE FOR PROVIDING A SECOND TAIL LENGTH

This application claims the benefit under 35 U.S.C. §119 (e) of U.S. Provisional Application Ser. No. 60/745,315, filed Apr. 21, 2006.

BACKGROUND OF THE INVENTION

The present invention relates to a device as well as a method for forming a sausage tail on a casing material that receives a filling product, in particular sausage meat, and more particularly relates to a device and method for forming a second sausage tail.

In particular, the invention relates to a device for forming a sausage tail on a casing material that receives a filling product, in particular sausage meat, wherein the sausage tail at least approximately does not contain filling product while being formed and wherein the device contains a feeding path for the casing material, which extends in an at least approximately linear direction, along which the sausage tail is formed, a supply unit for receiving a supply of empty casing material and a first unit for forming sausage tails that is capable of acting on the casing material in direction of the feeding path for forming a first sausage tail length by pulling off the casing material from the supply. Furthermore, the invention relates to a method for forming a sausage tail on a casing material that receives a filling product, in particular sausage meat, wherein the sausage tail at least approximately does not contain filling product while being formed and wherein the method includes the following steps: pushing forward a casing material that is pulled off from a supply of empty casing material along a feeding path for the casing material, which is at least approximately linear and forming a first sausage tail length along the feeding path by means of a first unit for forming sausage tails. This method in particular serves for operating the device mentioned above.

In the production of sausages and other foodstuff with casings made of foil material, e.g., cooked ham, in many cases it is desirable that the packaging of the foodstuff that is ready for consumption has another cross section than the typically round cross section. Frequently, a quadrangular, rectangular or square, cross section is desirable, for example, when used as a filling for a toast. For such approximately quadrangular packages, the filled casing is pressed after the closing process in a respective mould for obtaining its final cross section, wherein this final cross section is stabilized, e.g., by cooking. Since the perimeter of a quadrangular cross section is larger than that of a round cross section, such casing must not be filled completely. The package, which is not filled up to the possible volume and which therefore is a slack package, however has to be substantially free from air since inclusions of air can be harmful to the filling product.

For producing packages, which are only loosely filled and which are closed such that they are substantially free from air, different methods are known (DE-A 22 54 943, DE-A 22 10 054, DE-A 20 54 441). These methods however have certain disadvantages.

For avoiding these disadvantages, a method known from the European patent application 0 065 807 proposes that the required additional casing material for such incompletely filled packages by pulling off further unfilled casing material is made possible due to the fact that pressing plates act on the package, which at first is only filled partially, but tautly. This method is only appropriate for pasty masses that can be displaced by the pressing plates. In packages that are loosely filled, e.g., according to this method, the end of the package is drawn through an opening of a respective size for forming an extended sausage tail, wherein said opening can also be formed by the partially opened pairs of displacement arms (DE-A 35 05 375).

Furthermore, German patent 38 40 522 discloses a method for forming a sausage tail on a sausage casing that receives a sausage meat. This method is applied in a sausage clipping machine, the structure of which is largely conventional. Herein, after filling the sausage casing with the sausage meat, two pairs of displacement arms are closed, such that a portion of the sausage casing that receives the sausage meat as well as an empty portion of the sausage casing are formed. Subsequently, the pair of displacement arms that is closest to the free end of the closed sausage casing is moved along the feeding path of the sausage casing material such that the portion of the sausage casing, which is filled with the sausage meat, is moved in feeding direction of the sausage casing material and simultaneously, empty sausage casing material is being pulled after by the second pair of displacement arms. This empty sausage casing material forms the desired sausage tail. As soon as the required sausage tail length is achieved, a second clip is set on the side of the second pair of displacement arms that does not point to the first pair of displacement arms and subsequently, the sausage casing material is separated off.

In this method, which already functions quite well, a desirable improvement would be the non-limitation of the length of the sausage tail that is determined by the traveling path of the second pair of displacement arms. Due to the linear movement, a relatively large installation space for the machine is required in total. If a larger sausage tail length is required, it is quite possible that this known device is not sufficient.

SUMMARY OF THE INVENTION

An objective of the present invention is to provide a device as well as a method of the type discussed at the beginning that make possible that the sausage tail length can be easily increased.

The second unit for forming the sausage tails, which is capable of generating a second sausage tail length by pulling off further casing material from the supply, allows that the sausage tail length can be easily extended without the need of further moving the first unit for forming the sausage tails. As a result of the so obtained splitting up of the total movement for forming the sausage tails or respectively due to the fact that the movement for forming the sausage tails is split into in a first and a second partial movement, it is possible that the installation space for the device according to the invention can be equal or even smaller despite the increased length of the sausage tail in comparison to the state of the art.

For achieving a more compact and space-saving structure, it can furthermore be provided that the second unit for forming sausage tails is capable of acting on the casing material for generating the second sausage tail length in a transverse direction to the feeding path of the casing material for forming a tail loop. Herein, the reversible movement of the second unit for forming sausage tails provided therefor can be linear when it moves out of a starting or respectively standby position into a working position or respectively a position for extending sausage tails, or the unit for forming the sausage tails can be pivoted. The latter thus supports a highly compact and space-saving structure of the device according to the invention. Of course, it can also be provided that the second unit for forming sausage tails can be reversibly pivoted from the standby position into the working position or respectively the position for extending the sausage tails during the movement for forming the sausage tails and preferably subsequently can be moved in a linear direction for achieving a combined movement.

Furthermore it can be provided, for the second sausage tail length being formed without waste of space, that the second unit for forming sausage tails has at least one support having at least one looper. The looper therein can have at least one element for forming loops that is capable of coming in contact with the sausage tail during the movement for forming the sausage tails.

For forming the sausage tail loop, the element for forming the loops can, for example, make a rotational movement. Depending on the length of the thus formed loop, it can be necessary to provide certain elements that allow drawing off the loop from the element for forming the loops. An easier solution is provided by the fact that the element for forming the loops can be reversibly moved in a linear direction.

For generating a maximum length of the tail loop and thus a maximum second length for the sausage tail, it is furthermore advantageous if the looper has several elements for forming the loops that are capable of receiving between them the sausage tail during the movement for forming the sausage tail. Thus, during the forming of the loops, a defined way for the loop is provided. The number of the elements for forming the loops can be selected depending on the shape of the loop. Of course, it is also possible that several supports, in particular two supports, are provided on the second unit for forming the sausage tails, which in turn have several elements for forming loops, instead of one looper having several elements for forming the loops. As far as the number of elements for forming the loops is concerned, it is to be noted that, for example, when a U-shaped loop is to be formed, three elements for forming loops are advantageous, wherein in a design of the second unit for forming the sausage tails with, for example, two supports, two elements for forming the loops are disposed on one support and a further element for forming loops is disposed on the another support. The latter can be moved in a linear direction for forming the base, or respectively the apex of the loop. If in contrast, for example, a dovetailed loop is desired for further increasing the length of the loop and thus the second length of the sausage tail, the arrangement of the elements for forming the loops in a design of the second unit for forming the sausage tails having for example two supports can be designed such that two elements for forming loops can be attached to one support and two further elements for forming loops can be attached to the second support, which herein can again be designed such that it can be moved in a linear direction. These elements for forming the loops on the second support can be expanded after achieving a linear final moving position of the second support at least approximately in the direction of movement of the second support, thus forming the dovetailed loop.

If the elements for forming the loops can be adjusted in their position relatively to each other, thereby an adjustment to different diameters of the sausage tail can be achieved.

In case the looper has three elements for forming the loops, which are preferably arranged in an equal-sided triangle, wherein the triangular arrangement is effected in particular such that in case of contact of the looper with the sausage tail that is formed by the first unit for forming the sausage tails the element for forming the loops, which represents the tip of the triangle, is disposed above the sausage tail and the elements for forming the loops that represent the base of the triangle are disposed below the sausage tail, the two elements for forming the loops that define the base of the triangle form the deviation points for the sausage tail where it is deviated from its orientation, which extends at least approximately along the linear feeding path for forming the loop. Principally, the deviation can be any angle, wherein a deviation of 90° offers the possibility of forming a maximum loop length on minimum space. In other words, in this design, the elements for forming the loops receive between them the sausage tail that has been formed by the first sausage tail forming unit after contact with the sausage tail.

In order that the looper can securely come in contact with the sausage tail formed by the first unit for forming the sausage tail, it is furthermore provided that the height of the triangle of the three elements for forming the loops is selected such that it is higher than the diameter of the sausage tail that is formed by the first unit for forming the sausage tails.

If the element that forms the tip of the triangle, i.e., the element for forming the loops that is disposed between the two external elements for forming the loops can be reversibly moved in a linear direction, the length of the loop or respectively, its height, i.e., the distance between the peak of the loop und the feeding path, along which the sausage tail that is formed by the first unit for forming the sausage extends, can be formed according to the respective requirement. Furthermore, a space-saving formation of loops can be achieved.

In order that the casing material can slide along the at least one element for forming the loops without being damaged when the loop is designed and when it is withdrawn, it is furthermore provided that the element for forming the loops is designed such that it has low friction. This can be achieved in different ways, for example by attaching the element for forming the loops on the support such that it is pivotable and/or that the element for forming the loops is provided with a low-friction surface on its outer face at least on a portion.

The element for forming the loops can have various designs. A particularly easy possibility consists in the element for forming the loops being formed by a roll.

Principally, the second unit for forming the sausage tails can start its movement for forming the sausage tails after the first unit for forming the sausage tails has completed its own movement for forming the sausage tails. Therein, the sequence of the processes or respectively movements can be controlled and monitored by an open- or closed-loop control device, in particular a program-controlled open- or closed-loop control device. It is as well possible that the second unit for forming the sausage tails begins its operation or respectively its movement when the formation of the sausage tail that is carried out by the first unit for forming the sausage tail is not yet completed. Therein, the sequence of processes or respectively movements can be controlled and monitored by an open- or closed-loop control device, in particular a program-controlled open- or closed-loop control device. Alternatively or additionally, it can furthermore be provided, that at least one sensor device for monitoring the sequence of movements of at least the first unit for forming the sausage tails can be disposed. Therein, the function of the sensor device can for example be optical, electrical or mechanical.

As a first unit for forming the sausage tails, various devices can be used. If the device according to the invention is used for example in a clip machine, the first unit for forming the sausage tails can be formed by a device for displacing filling product, which at least has a first and a second displacement unit, wherein at least the second displacement unit can be reversibly moved at least approximately in feeding direction of the casing material for forming the first sausage tail length. As displacement units, various variants can be used. Thus, the possibility that at least one of the displacement units is formed by a pair of displacement arms exists. As well, there exists the possibility that the first and/or the second displacement unit are respectively formed by an iris displacer.

In order that the filling product received by the casing material is securely retained in said casing material during the further processing, a unit for setting a closing means can be provided that is capable of setting closing means, in particular clips, for closing the casing material for forming finished filled products.

For obtaining the casing material filled with the filling product and provided with the sausage tail as a separate product, a separating unit can be provided that is capable of separating off portions of the casing material from the casing material supply for forming the finished filled products.

For filling the casing material, a filling unit, preferably a filling pipe can be provided that is capable of introducing filling product into the casing material. Herein, the supply of empty casing material can be disposed on the filling unit. If the filling unit is for example formed by a filling pipe, the casing material can be disposed on the side of the outer perimeter of the filling pipe. Then, the supply unit is formed by the supply of casing material as well as the side of the outer perimeter of the filling pipe.

As already mentioned hereinabove, the forming of the second sausage tail length can be started before the forming of the first sausage tail length is completed. As well, there is the possibility of starting the formation of the second sausage tail length after at least half of the first sausage tail length is formed. Furthermore, the forming of the second sausage tail length can be started after forming the first sausage tail length.

Therein, the beginning of the movement of the second unit for forming sausage tails can be controlled by a sensor device that monitors the movement of the first unit for forming sausage tails.

Furthermore, it can be provided that for forming the second sausage tail length, a tail loop is formed on the first sausage tail length that is formed by the first unit for forming the sausage tails.

Herein, a device for forming the tail loop can be reversibly moved, in particular pivoted to, a portion of the first sausage tail length formed by the first unit for forming sausage tails, and subsequently, at least one element for forming loops of the looper can be reversibly moved in a linear direction.

Furthermore, there exists the possibility of tightly closing an end of the casing material for forming the first sausage tail length, which points to the direction of the feeding path by at least a first closing means, in particular a closing clip, of subsequently filling product into the casing, of subsequently separating one portion of the casing material filled with filling product from the still empty casing material by means of a device for displacing filling product having at least a first and a second displacement unit and subsequently moving the first displacement unit along the feeding path by taking with it the portion of the casing material filled with filling product by drawing off at the same time the still empty casing material.

Furthermore, it can be provided that after forming the second sausage tail length at least a second closing means, in particular a closing clip, is set for closing the casing material such that it is tight to the filling product and the casing is separated off in the region of the side of the closing means that points in the opposite direction of the feeding direction of the casing material for thus forming a finished filled product.

Further advantageous designs as well as an exemplary embodiment of the device according to the invention or respectively the method according to the invention will be discussed in the following with reference to the accompanying drawings. The terms "left", "right", "up" and "down" used in the present description relate to the drawings in an orientation where the reference signs or respectively descriptions of the figures can be normally read.

DETAILED DESCRIPTION

In the FIGS. 1 to 10, the device according to the invention is schematically represented, wherein it is to be noted that only the components that are important for understanding the invention are shown. As it can be seen in the figures, the device according to the invention is used in a sausage clip machine for producing sausage products W.

Figure 1:
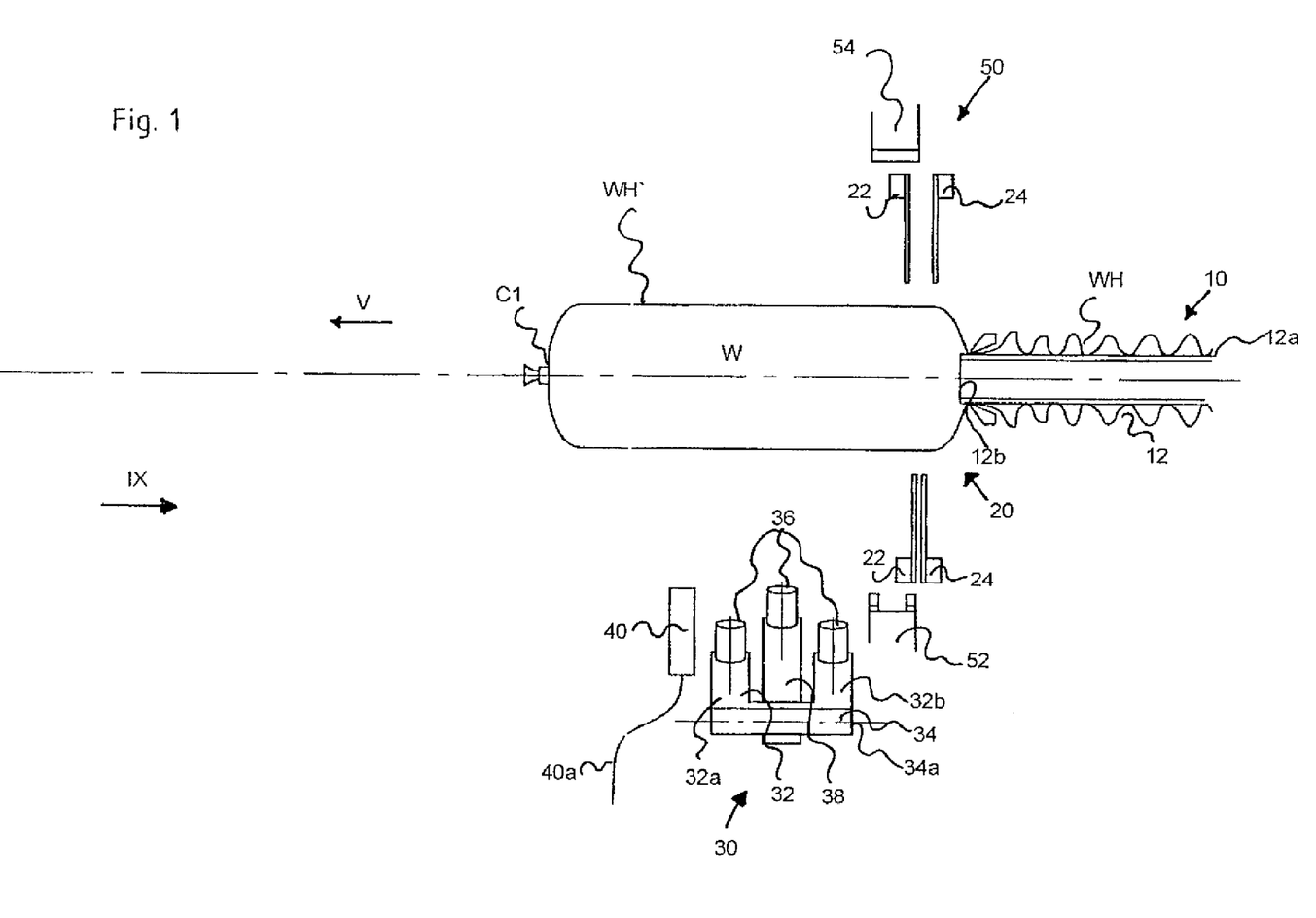
FIG. 1 to 8 show diagrammatic lateral views that represent the device according to the invention as well as the method according to the invention during different working steps.

The device according to the invention at first has a supply unit 10 for receiving an empty casing material, which is formed in the present exemplary embodiment by an elastic sausage casing material WH. The supply unit 10 is formed by the outer perimeter surface 12*a* of a filling pipe 12 having a substantially circular-cylindrical ring cross section as well as the empty sausage casing material WH disposed on this outside surface 12*a*. The sausage casing material WH is disposed on the outer perimeter surface 12*a* similar to an accordion, as can be seen in FIG. 1. The filling pipe 12 furthermore has a mouth opening 12*b* pointing to the left side from that filling product that is not further described—herein, sausage meat—can be filled into the sausage casing WH.

The sausage casing material or respectively the sausage casing WH can be pushed forward to the left by the filling pressure of the filling product that is introduced into the empty sausage casing WH, away from the filling pipe 12 along a feeding path, which is substantially linear and extends in a horizontal direction represented by the arrow V in FIG. 1. The thus formed sausage product W or respectively the portion WH' of the sausage casing WH filled with filling product can rest on a support that is not further represented, as for example, a conveyor belt.

The device according to the invention furthermore contains a first unit for forming sausage tails 20 that is formed by a unit for displacing filling product. The unit for displacing filling product 20 has a first iris displacer 22 and a second iris displacer 24 that are disposed on the feeding path V on the right side of the first iris displacer 22. As will be described in more detail in the following, the first iris displacer 22 can be reversibly moved in a linear direction from a starting position during a movement for forming sausage tails for the first length of the sausage tail Z (See FIG. 3) along a feeding path V for the sausage casing WH or respectively along a path for forming sausage tails to a working or respectively a final position for forming sausage tails.

Figure 9:
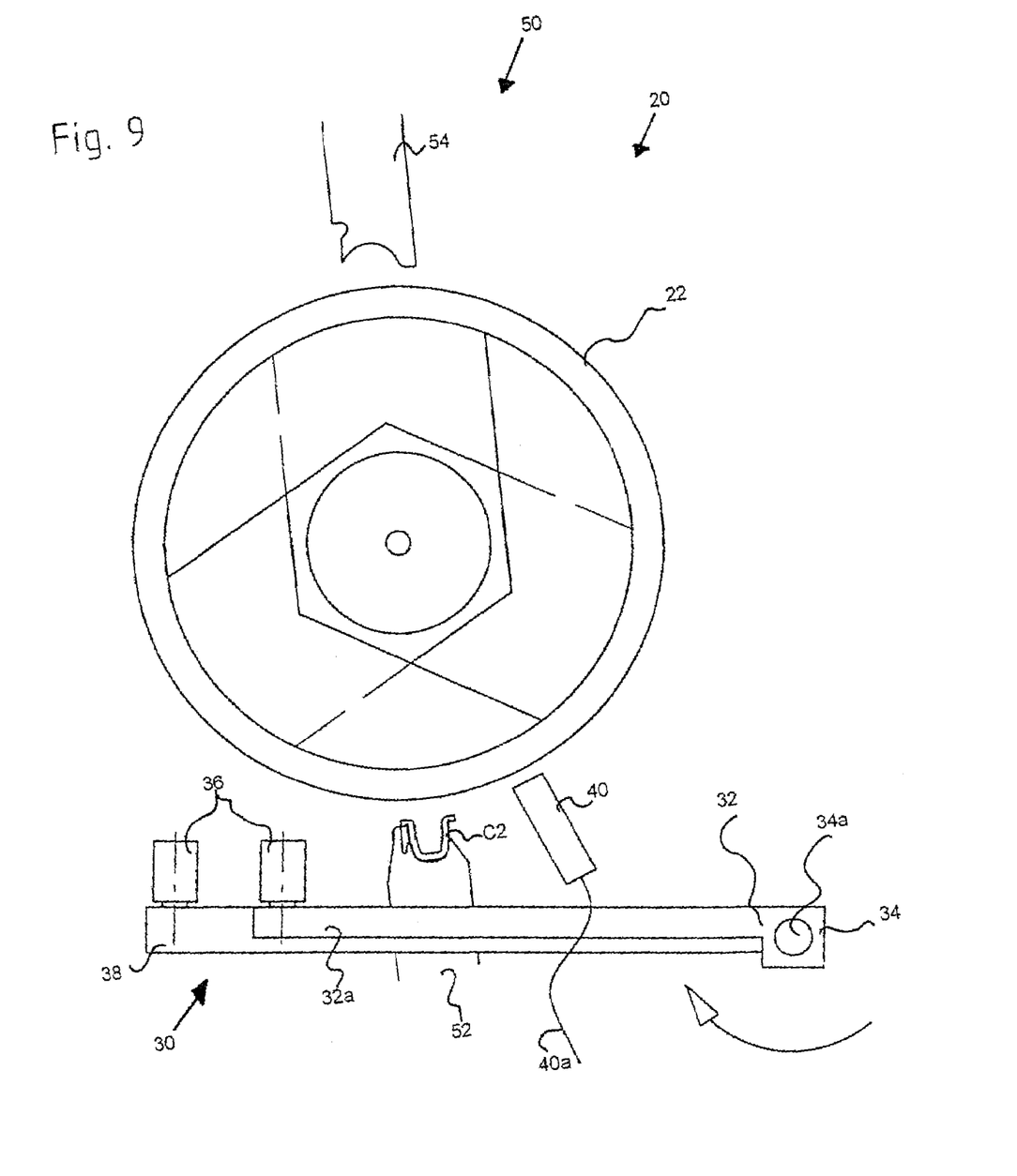
FIGS. 9 and 10 show views along the line IX-IX in FIG. 1.

In addition to the first unit for forming sausage tails 20, a second unit for forming sausage tails 30 is provided, which is in its starting position below the path for forming the sausage tail or respectively the feeding path V as shown in the FIGS. 1 and 9. The second unit for forming a sausage tail 30 has a looper, which is not further described having a first support 32 that in the top view has the shape of the letter "U", both legs of which are parallel to each other and are represented by 32*a*, 32*b*. The first support 32 is connected to a pivot device 34 for effecting a respective movement by means of the legs 32*a*, 32*b* of the letter "U", which can be seen in FIG. 4.

On both free ends of the U-legs 32*a*, 32*b*, respectively one deviation roll 36 is disposed such that it is pivotable. The deviation rolls 36 are attached to the U-legs 32*a*, 32*b* such that they point in direction of the feeding path V in the starting position of the second unit for forming a sausage tail 30 shown in the FIGS. 1 and 9. On their cylindrical outer perimeter surfaces, the deviation rolls 36 can be coated with a material having low friction.

In addition to the first support 32, a second support 38 is provided in the second unit for forming sausage tails 30, which in the top view, at least approximately has a rectangular shape and is disposed between both legs 32a, 32b of the first support 32. The second support 38 as well is connected to the pivot device 34 for effecting a respective movement. Additionally, the second support 38 as well is provided on its end that is opposite to the swiveling device 34 with a pivotable deviation roll 36 that has the same orientation and design as the two deviation rolls 36 on the U-legs 32a, 32b of the first support 32.

Figure 3:
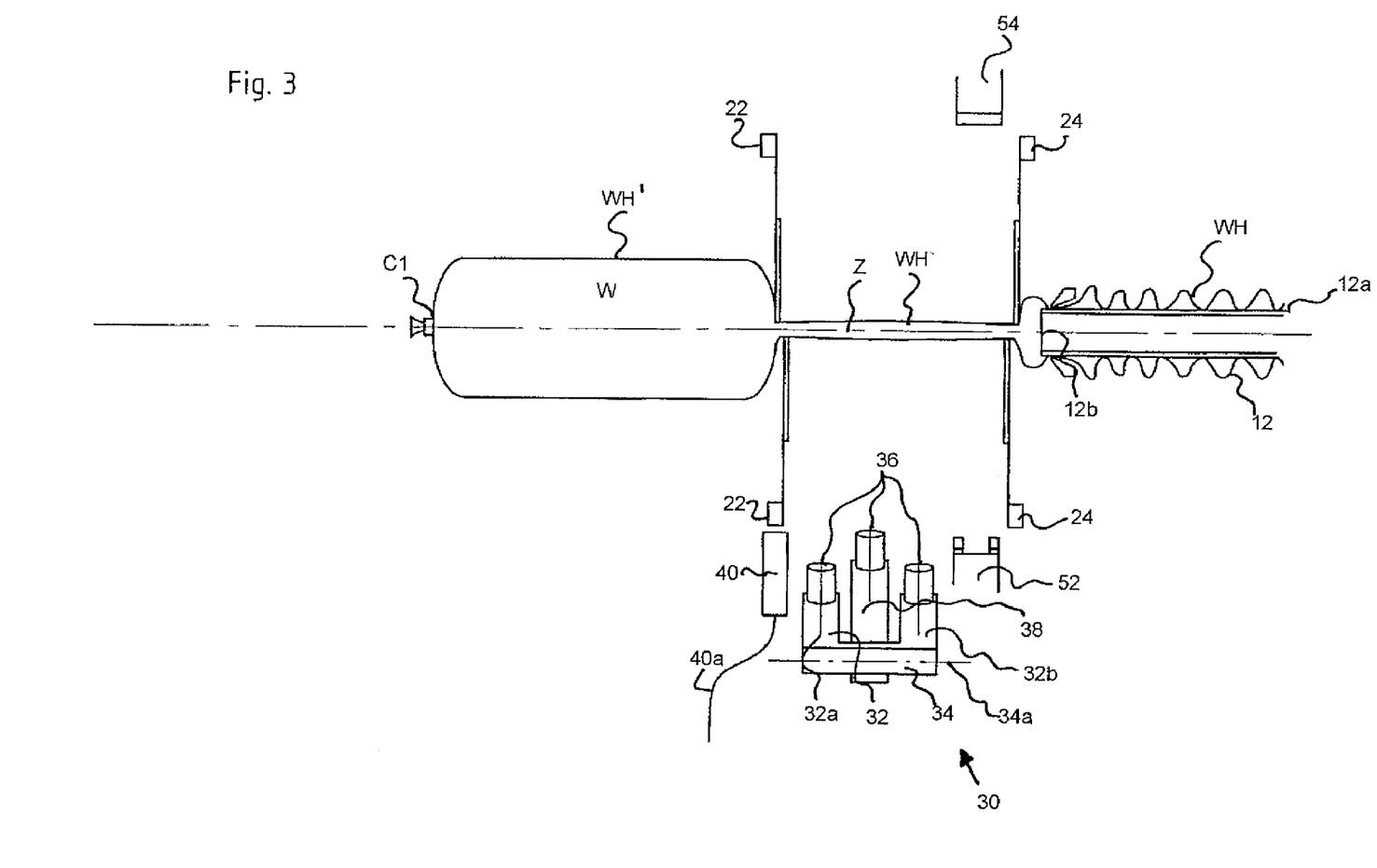
Figure 4:
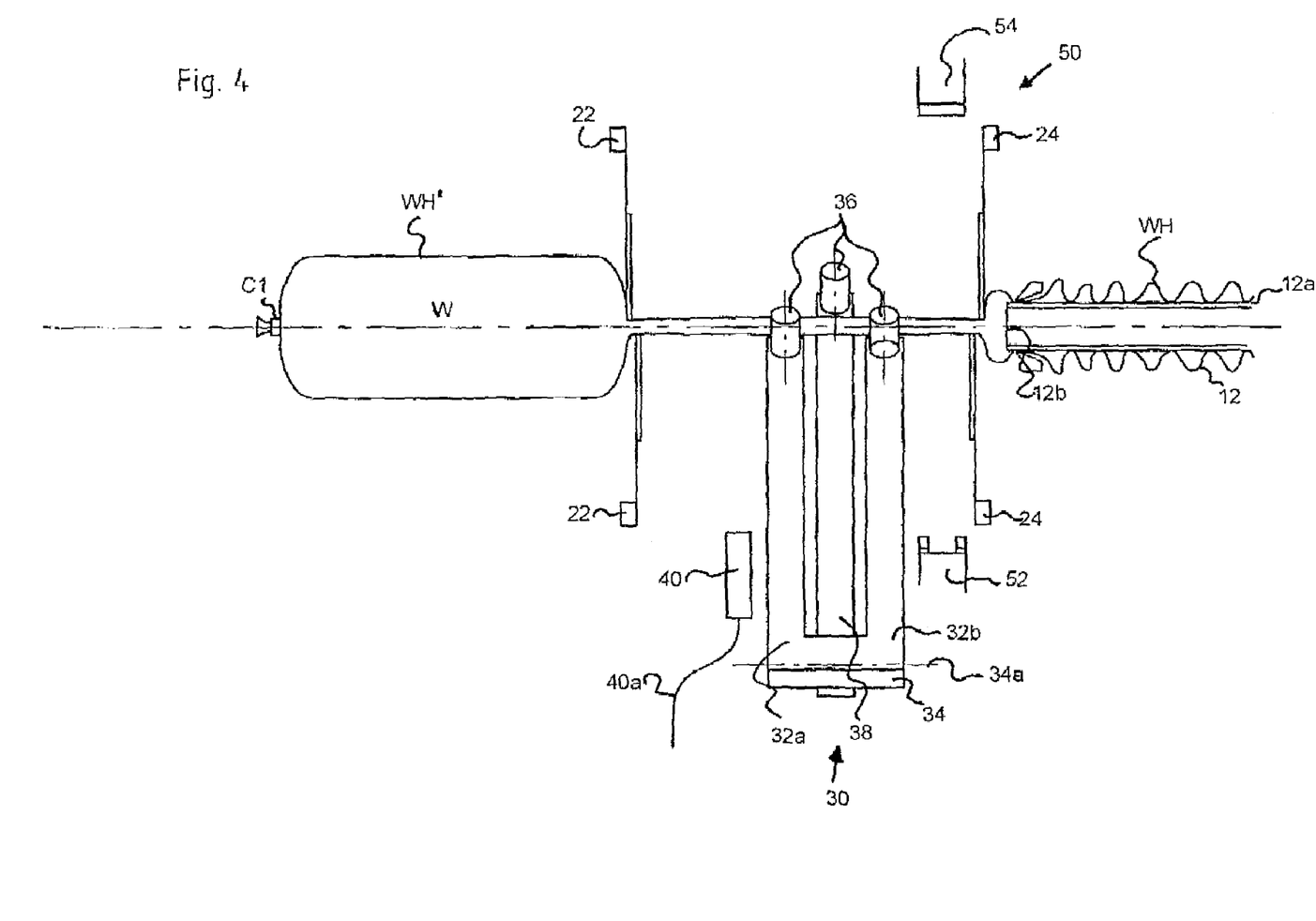
Figure 10:
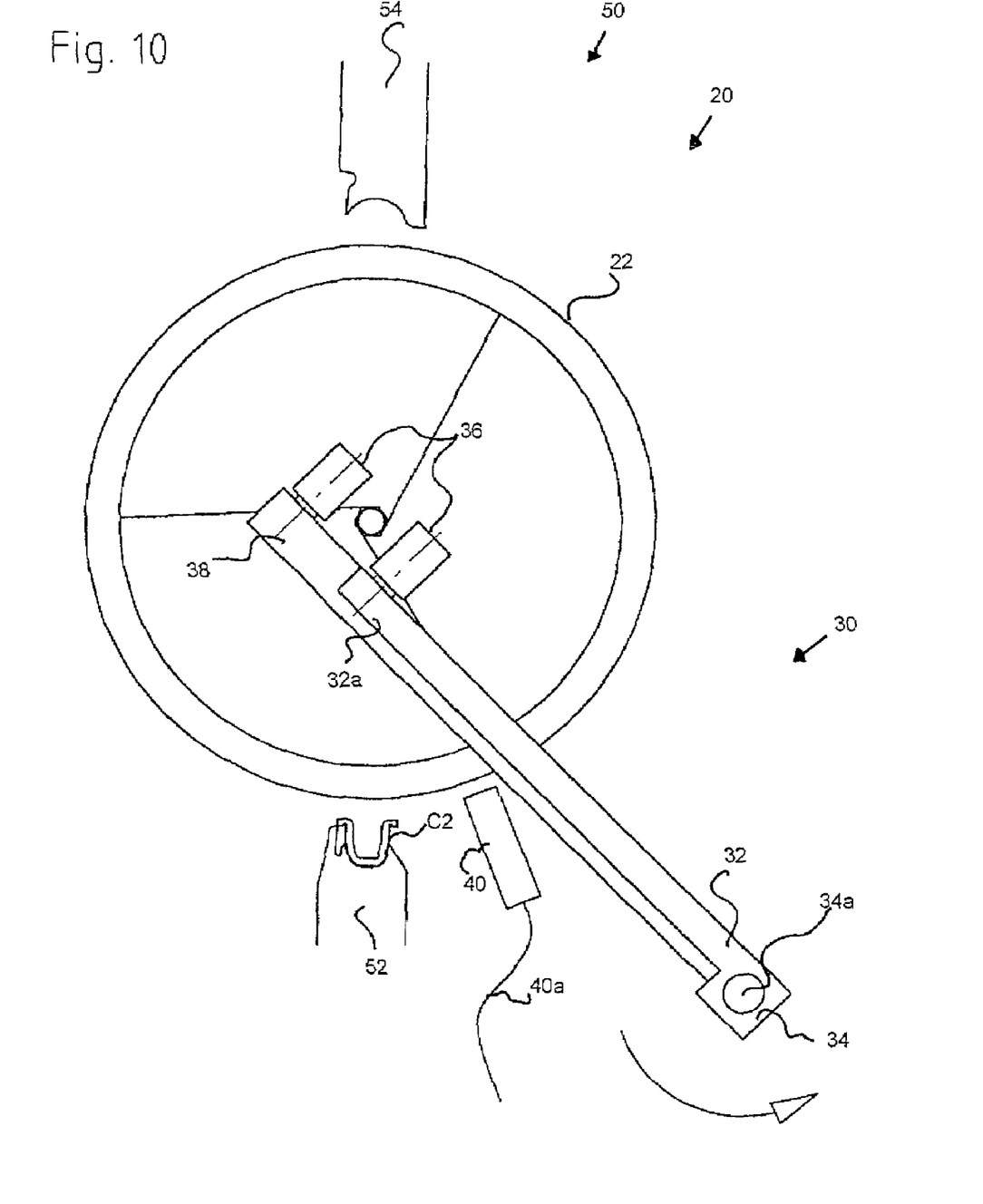

As it can be seen for example in the FIG. 1 or FIG. 4, the three deviation rolls 36 span a triangle, which is preferably equal-sided, wherein the deviation roll 36 that is provided on the second support 38 forms the tip of the triangle and the two deviation rolls 36 provided on the legs 32a, 32b of the first support 32 form the base of the triangle. The height of the triangle, i.e., the distance from the deviation roll 36 that forms the tip of the triangle on the second support 38 to the base line of the triangle defined by the two deviation rolls 36 of the first support 32, therein is adjusted or respectively can be adjusted such that the sausage tail that is formed by the first unit for forming sausage tails 20 (see FIGS. 3 and 4) can be received between the deviation rolls 36 when the second unit for forming sausage tails 32 has taken its position for forming sausage tails by reversible pivoting from the starting position, as it is shown in FIGS. 4 and 10.

Furthermore, the second support 38 is connected to a device for effecting a reversible linear movement. (Not shown) Thus, the second support 38 can be moved from the starting position shown in FIG. 1 to a position for forming loops, which will be further described in the following and is shown in the FIG. 5, in a direction that is substantially perpendicular to the feeding path V or respectively perpendicular to the sausage tail Z formed by the first unit for forming sausage tails 20. In a linear movement, the second support 38 can be guided on the inner surfaces not further referenced of the legs 32a, 32b of the first support 32.

Of the pivot device 34, solely its rotational axis 34a is shown that extends at least approximately horizontal and parallel to the feeding path V of the sausage casing material WH. The first and the second support 32, 38 can be reversibly swiveled about the rotational axis 34a by means of the pivot device 34 that possesses a motor which is not further represented, simultaneously from the starting position in the plane surface of the FIGS. 9 and 10 into the working position shown in the FIGS. 4 and 10. Subsequently or shortly before, the second support 38 can begin its linear traveling movement as will be further described in the following.

On the left side next to the second unit for forming the sausage tails 30, a sensor 40 is provided that is connected by a wire connection 40a to an open- or closed-loop control device which is not further described. The sensor 40 has the function of capturing the movement of the first sausage tail forming unit 20, in particular the fact that the portion WH' of the sausage product W filled with filling product has completely passed. Depending on the control process selected, the pivoting movement of the second unit for forming sausage tails 30 can already begin before the portion WH' of the sausage casing WH filled with filling product has completely passed. As well, the beginning of this swiveling movement is also possible after the portion WH' having completely passed.

The device according to the invention finally has a clip setting unit 50 that consists of a matrix 52 and a die 54. The clip setting unit 50 is capable of setting closing means in the form of clips C1, C2, C3 for closing the front sides of the sausage casing WH of a sausage product W such that it is tight to the filling product (see FIGS. 1 and 7). Furthermore, the clip setting unit 50 is provided with a separating knife 56 that forms the separating unit that serves for cutting in two the sausage casing WH according to the method described hereinbelow. The clip setting unit 50 therein is arranged such that in the case of iris displacers 22, 24 that have been moved apart, it can move into the interspace thus formed for setting the clips C1, C2, C3.

The operation mode of the device according to the invention or respectively the method according to the invention is as follows:

Before a new sausage product W can be filled with sausage meat, a clip C1 is set by means of the clip setting unit 50 on the free end of the empty sausage casing WH. This clip C1 closes the sausage casing WH such that it is tight to the filling product, so that subsequently, the filling process can be started. To this end, the sausage meat is conveyed through the filling pipe 12 to the filling pipe opening 12b. During the filling process pointing to the left, the sausage casing material WH is displaced to the left side due to the filling product that is introduced into the sausage casing WH and the thus generated pressure within the sausage casing, wherein at the same time, empty sausage casing WH is drawn from the supply unit 10. This is shown in FIG. 1.

Figure 2:
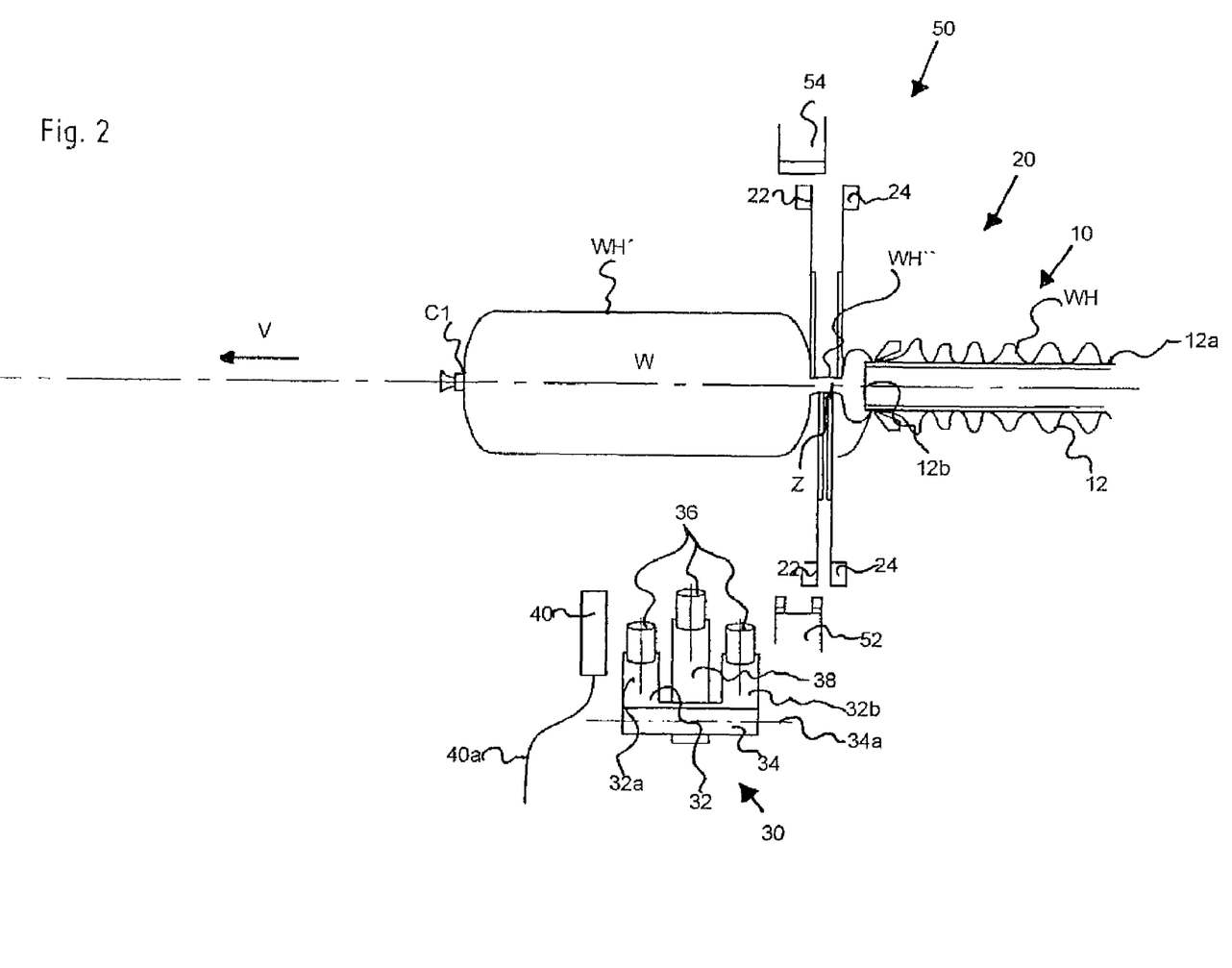

After the desired quantity of filling product has been filled into the sausage casing WH and a sausage casing portion WH' filled with filling product representing the formed sausage product W has been pushed forward to the left side along the feeding path V, the first iris displacer 22 as well as the second iris displacer 24 are closed such that on the sausage casing material WH, the first sausage casing portion WH' is clearly formed that is filled with filling product, as well as a second, empty sausage casing portion WH", which extends between both iris displacers 22, 24 and is preferably shorter in comparison to the first sausage casing portion WH' and forms the first part of the sausage tail Z that is to be formed. This is shown in FIG. 2.

Subsequently, the first displacement unit 22 is being moved to the left side, i.e. in direction of the end of the sausage casing WH closed by the clip C1 along the feeding path V. Therein, empty sausage casing material WH is pulled from the supply unit 10 or respectively the outer surface 12a of the filling pipe 12. Since the second iris displacer 24 is not completely closed, the empty sausage casing WH can be drawn through the second iris displacer 24. Thus, a first length of the sausage tail Z is formed along the feeding path V between the first iris displacer 22 and the second iris displacer 24. This is shown in FIG. 3.

After passing in front of the sensor device 40 through the first iris displacer 22, the second sausage tail unit 30 is pivoted about the rotational axis 34a from its non-operating position shown in the FIGS. 1 to 3 and 9. After completing the swiveling movement, the three elements for forming loops 36 provided on the second unit 30 for forming sausage tails, or on the first and the second support 32, 38 are coming in contact with the first length of the sausage tail Z formed by the first unit for forming sausage tail 22. Therein, the two elements for forming loops 36 of U-legs 32a, 32b are beneath the sausage tail Z, whereas the upper element for forming loops 36 of the second support 38 that forms the triangle tip is disposed above the sausage tail Z as it can be seen in the FIGS. 4 and 10.

Figure 5:
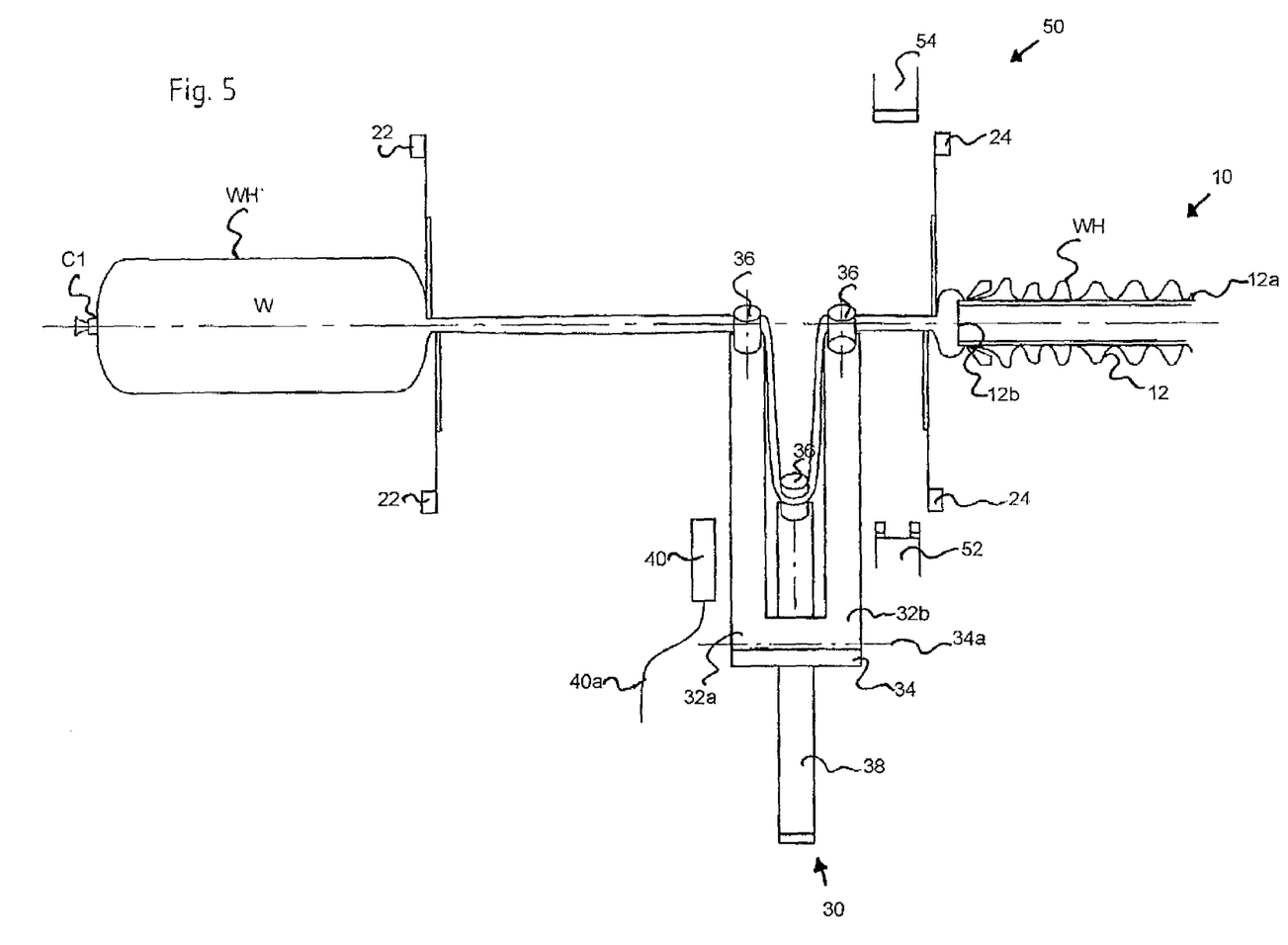
Figure 6:
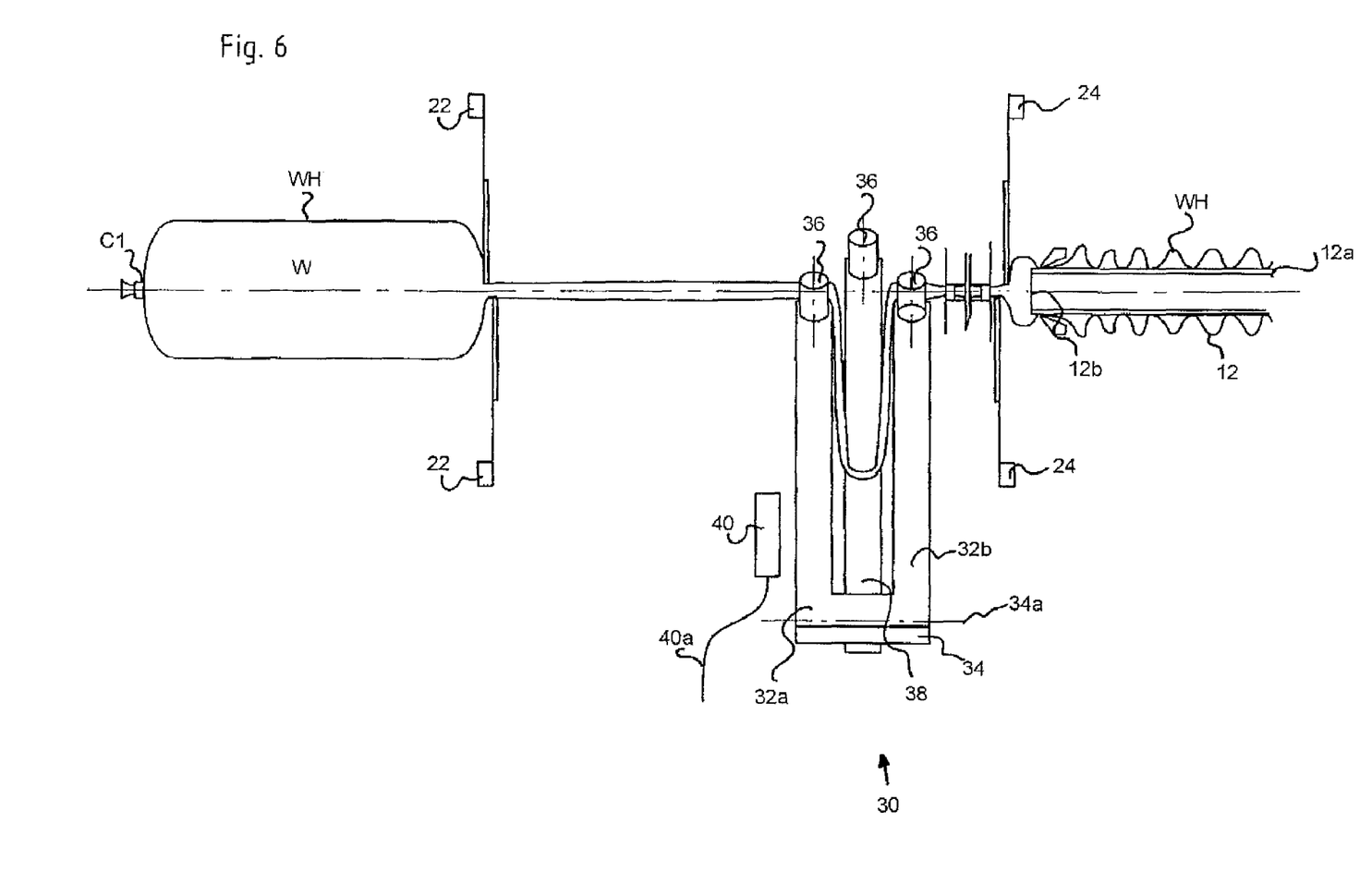

After completing the movement for forming the sausage tails by the first unit for forming the sausage tails 22, 24, the central loop forming element 36 of the second support 38 is moved linearly downwards by means of the driving element that is not further represented as it is shown in the FIG. 5. Therein, a further empty sausage casing material WH is pulled from the supply unit 10 and simultaneously, a loop is formed in the sausage tail Z that forms the second length of the formed sausage tail Z.

After completing the forming of the loops by means of the second support 38, a second and a third closing clip C2, C3 are set on the empty sausage casing material WH by means of the clip setting unit 50. Hereby, the second clip C2 forms the end of the generated sausage tail Z and thus of the sausage product W that is also formed, whereas the third clip C3 forms the first clip for the following sausage product W. Subsequently, by means of the separating knife 56, the sausage casing material WH of the thus formed sausage product W is separated between the second and the third clip C2, C3 from the empty sausage casing material WH that is in the supply unit 10, as it is shown in the FIG. 6. At the same time, shortly before or shortly after, the second support 38 returns to its starting position in a linear movement such that the element for forming loops 36 of the second support 38 is out of contact with the loop or respectively the sausage tail Z, as it is also shown in the FIG. 6.

Figure 7:
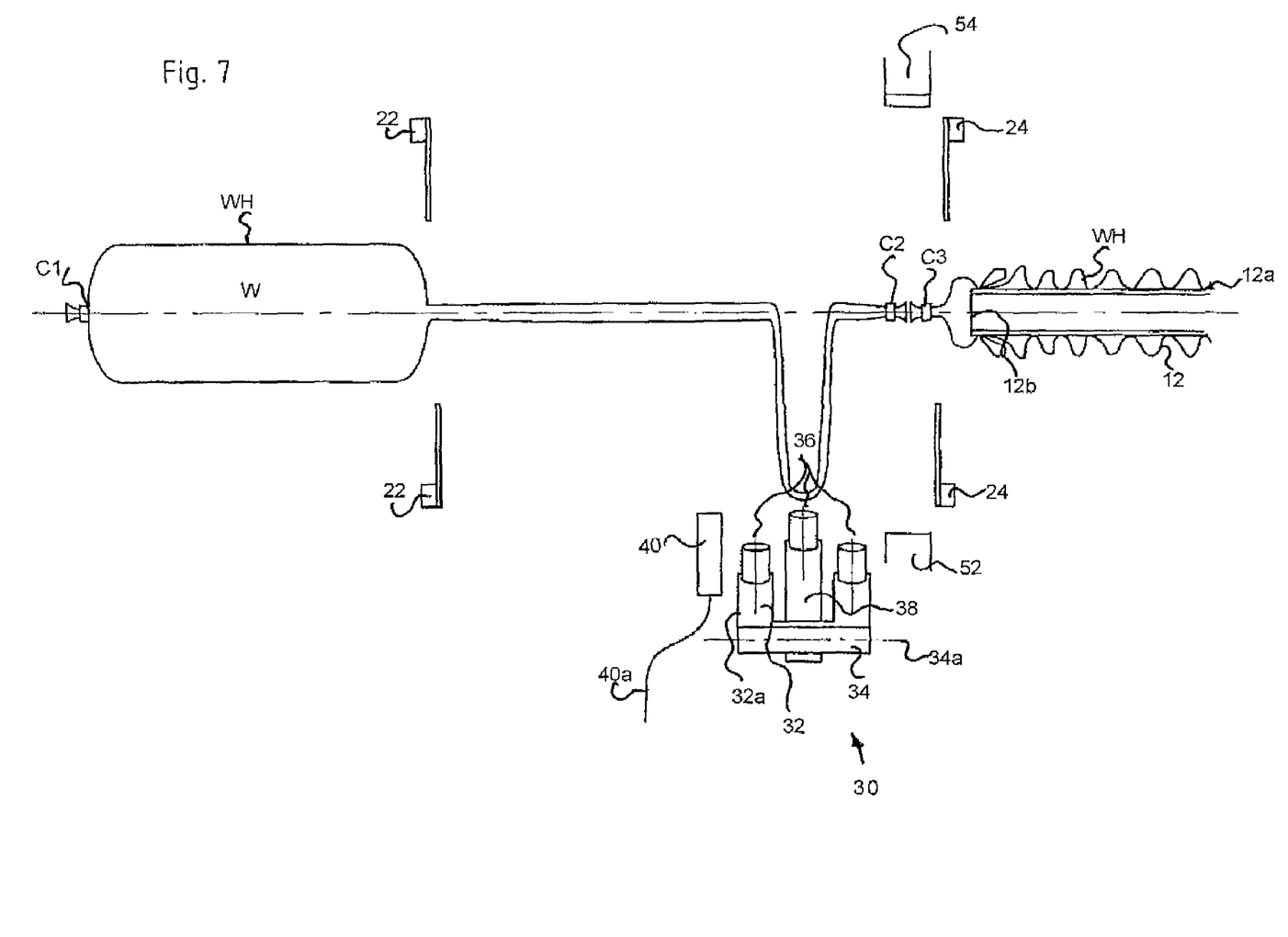
Figure 8:
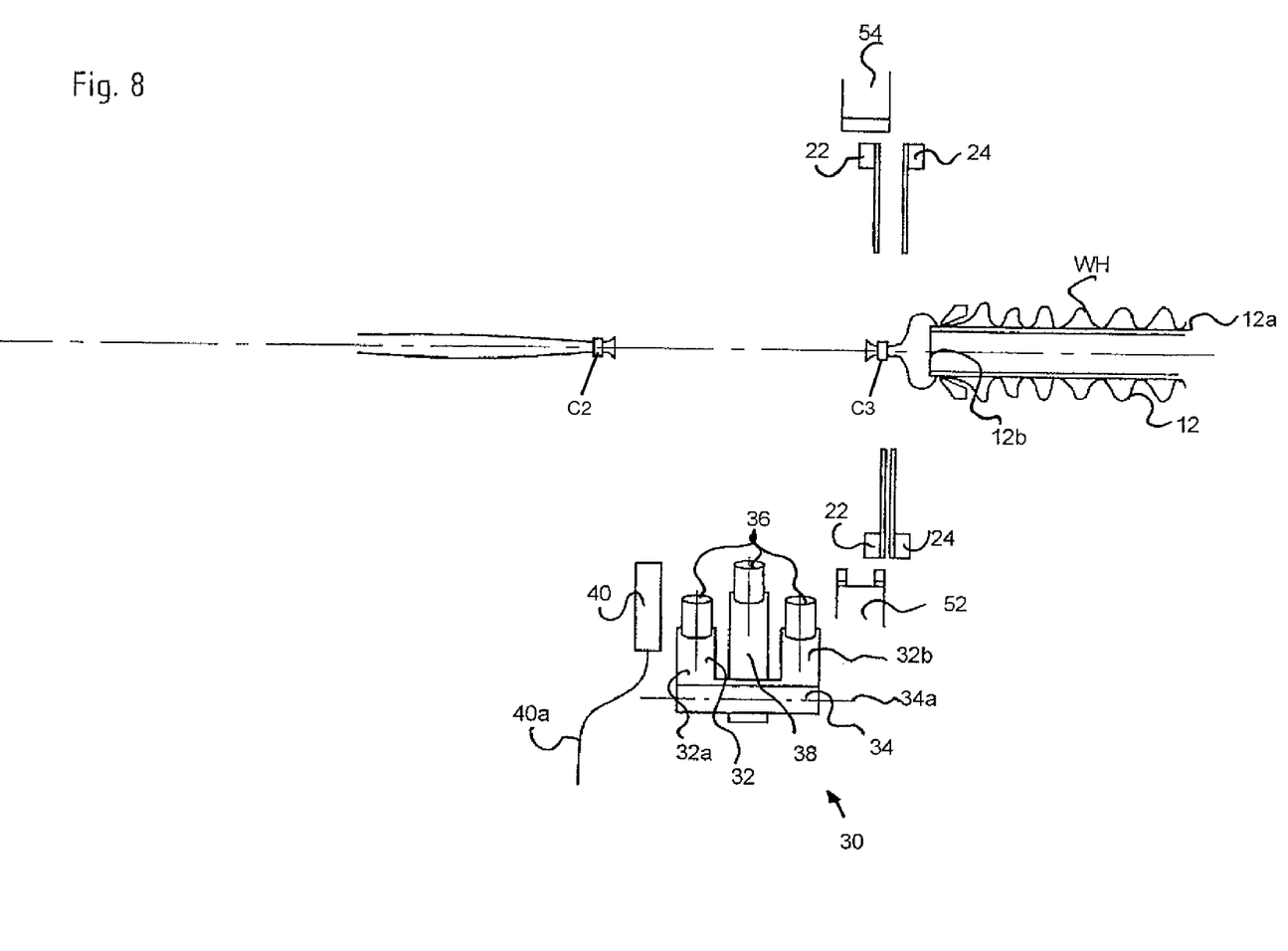

Subsequently, the second unit for forming sausage tails 30 goes back into its starting position and the formed sausage product W with the sausage tail Z can be output by means of the conveyor belt, which has already been mentioned in the foregoing as it is shown in the FIGS. 7 and 8. Subsequently, a new sausage product W having a sausage tail Z can be produced in the manner described above.

The invention claimed is:

1. Device for forming a sausage tail on a casing material that receives a filling product, where the sausage tail does not contain substantial amounts of filling product, at least while the tail is being formed, a feeding path for the casing material extends at least approximately in a linear direction and along which the sausage tail is formed, and a supply of empty casing material is provided, the device comprising:
    a first unit for forming sausage tails capable of, the first unit acting on the casing material in direction of the feeding path, forming a first sausage tail length by pulling the casing material from the supply; and
    a second unit for forming sausage tails capable of generating a second sausage tail length by pulling further casing material from the supply.

2. Device according to claim 1 wherein the second unit for forming sausage tails is capable of acting on the casing material in a direction transverse to the feeding path of the casing material for generating the second sausage tail length.

3. Device according to claim 2 wherein the second unit for forming sausage tails is capable of being reversibly moved in a linear direction between a standby position and a position for extending the sausage tail when a movement for forming sausage tails is being effected.

4. Device according to claim 2 wherein the second unit for forming sausage tails is capable of being reversibly turned between a standby position and a position for extending the sausage tail when a movement for forming sausage tails is effected.

5. Device according to claim 1 wherein the second unit for forming sausage tails has at least one support with at least one looper.

6. Device according to claim 5 wherein the looper has at least one element for forming loops, the at least one element is capable of coming in contact with the sausage tail when the movement for forming the sausage tails is being effected.

7. Device according to claim 6 wherein the said at least one element for forming the loops is capable of being moved in a linear direction.

8. Device according to claim 7 wherein the looper has several elements for forming loops which are capable of receiving between them the sausage tail when the movement for forming the sausage tail is being effected.

9. Device according to claim 8 wherein the said at least one element for forming the loop is a low friction element.

10. Device according to claim 1 further comprising at least one sensor device for controlling movements of at least the first unit for forming sausage tails.

11. Device according to claim 1 wherein the first unit for forming sausage tails includes a device for displacing the filling product that has at least a first and a second displacement unit, wherein at least the second displacement unit can be reversibly moved at least approximately in the feeding direction of the casing material for forming the first sausage tail length.

12. Device according to claim 1 further comprising a unit capable of placing a closure for closing the casing material for forming finished filled products.

13. Device according to claim 1 further comprising a separating unit capable of separating off portions of the casing material from the supply of casing material for forming finished filled products.

14. Device according to claim 1 further comprising a filling unit, capable of introducing filling product into the casing material.

15. Device according to claim 1, wherein the second unit for forming sausage tails is capable of generating the second sausage tail length by pulling on the first sausage tail length.

16. Method for forming a sausage tail on a casing material, comprising the following steps:
    providing the device of claim 1;
    pushing forward a casing material that is pulled off from the supply of empty casing material;
    forming the first sausage tail length by operating the first unit for forming sausage tails;
    forming the second sausage tail length by operating the second unit for forming sausage tails.

17. Method according to claim 16 further comprising starting the process of forming the second sausage tail length before the step of forming the first sausage tail length is completed.

18. Method according to claim 16 further comprising starting the process of forming the second sausage tail length after the process of forming the first sausage tail length.

19. Method according to claim 16 where, during the step of forming the second sausage tail length, forming a tail loop on the first sausage tail length.

20. Method according to claim 19 where the step of forming the tail loop, includes reversibly moving a looper towards a portion of the first sausage tail length and
    subsequently moving at least one element for forming loops of the looper in a linear direction.

21. Method according to claim 16 where the step of forming the first sausage tail length includes,
    closing an end of the casing material, such that the end of the casing material is tight to the filling product, in that subsequently filling product is filled into the casing,
    then separating a portion of the casing material filled with filling product from the casing material that is still empty by operating a device for displacing the filling product, the device for displacing the filling product having at least one first and one second displacement unit and
    subsequently moving the first displacement unit along the feeding path, taking with the end of the casing material the portion of the casing material filled with filling product by simultaneously pulling off still empty casing material.

* * * * *